Figure 3:
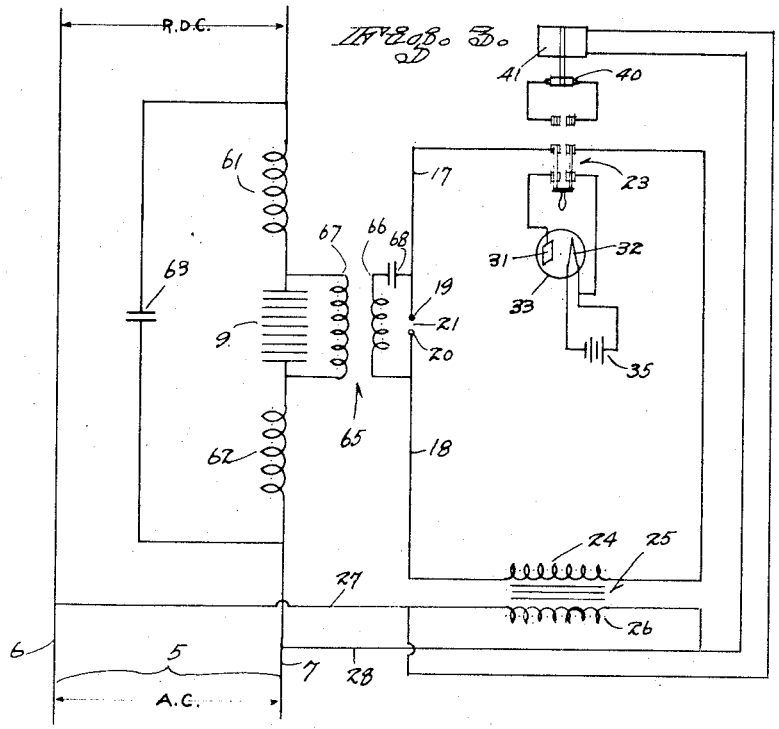

Dec. 11, 1928.
F. L. WALKER, JR
1,694,837
RECTIFYING SYSTEM
Filed Feb. 23, 1926      2 Sheets-Sheet 1
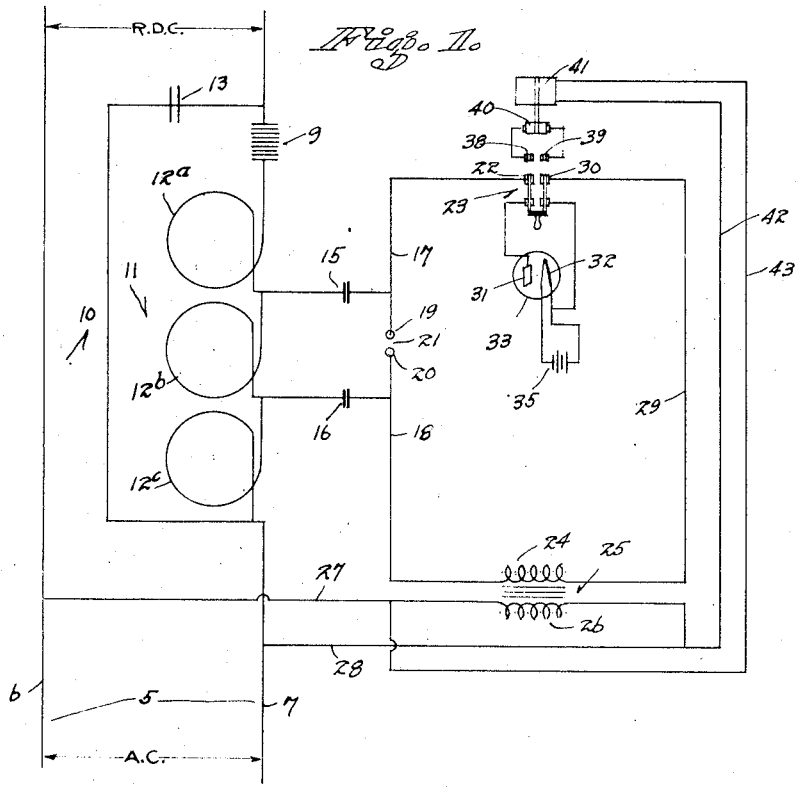
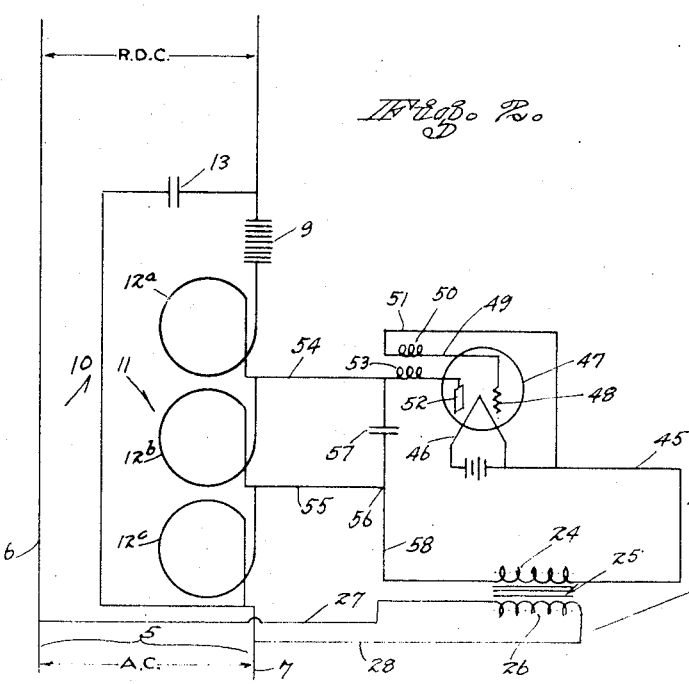
Inventor
FLETCHER L. WALKER, JR.
Attorneys.

Dec. 11, 1928.

F. L. WALKER, JR 1,694,837

RECTIFYING SYSTEM

Filed Feb. 23, 1926

2 Sheets-Sheet 2

Inventor
FLETCHER L. WALKER, JR.

By

Attorneys.

Patented Dec. 11, 1928.

1,694,837

UNITED STATES PATENT OFFICE.

FLETCHER L. WALKER, JR., OF WESTWOOD, CALIFORNIA.

RECTIFYING SYSTEM.

Application filed February 23, 1926. Serial No. 90,703.

This invention relates to electrical rectifying systems.

In the drawings, Figures 1 to 4 inclusive show diagrammatically electrical rectifying systems of my invention.

In the drawings, the numeral 5 indicates a power line supplied with alternating current, one side of the line being designated by the numeral 6 and the other side by the numeral 7.

In Figures 1 to 4 inclusive, an air gap 9 is disposed in the sides 7 of the line. This air gap is unstable at the voltage of the alternating current to be rectified.

In Figures 1 and 2, connected in the sides 7 thereof, are oscillatory circuits 10 connected across the air gaps 9 and comprising coils 11, consisting of turns $12^a$, $12^b$ and $12^c$, and condenser 13.

In Figure 1 a condenser 15 is connected on one side to the coil 11 between the turns $12^a$ and $12^b$, while a condenser 16 is connected to the coil 11 between the turns $12^b$ and $12^c$. The other terminals of the condensers 15 and 16 are respectively connected to conductors 17 and 18, which terminate respectively at 19 and 20, the latter points being spaced from each other so as to form an air gap 21 therebetween. The conductor 17 is connected at 22 to a switch 23, herein shown as a double pole, double throw switch.

The conductor 18 is connected to one terminal of the secondary 24 of a transformer 25, the primary 26 of which is connected by means of conductors 27 and 28 across the line 5. The other terminal of the secondary 24 is connected by means of a conductor 29 to the switch 23 at the point 30. The switch 23 may be employed to connect the conductors 17 and 29 respectively to a plate 31 and a filament 32 of a thermionic rectifier 33, the filament of which is heated by a battery 35. The switch 23 may optionally be employed to connect the conductors 17 and 29 respectively to terminals 38 and 39, which are connected to the terminals of a rectifier 40, which is driven by a synchronous motor 41 connected across the line 5 by means of conductors 42 and 43. Either the rectifying contactor 40 or the rectifying thermionic tube, depending upon which is used, allows the spark gap 21 to be discharged only during one half the cycle of the voltage generated in the secondary 24 of the transformer 25, and therefore of the current produced in the primary 26 of the transformer 25.

Since the transformer 25 receives its energy from the alternating current supply, the discharge of the gap 21 will always be in phase with the alternating current supply; therefore the arc at the gap 9, being dependent upon the radio frequency current, will be started during one half of the alternating current sine wave, because the gap 21 is discharged only during one half of the alternating current supply wave and in phase with that supply.

The condensers 15 and 16 are charged by means of transformer 25 causing them to discharge through the spark gap 21, thereby causing the circuit, including the condenser 15 and the spark gap 21, the condenser 16 and the coil 11, to oscillate at high frequency. The coil 11 is part of the oscillatory circuit which includes the coil 11, the gap 9 and the condenser 13, and hence energizes that circuit, causing a high voltage, high frequency potential across the gap 9, thereby ionizing the air in the gap; this circuit will then oscillate, thereby starting the low voltage, low frequency alternating current from the alternating source to flow through the circuit, one half of the wave being cut out so that an unidirectional current is produced. The arc A being unstable at the voltage of the alternating current supply, will not maintain itself without the aid of the high frequency current.

The condensers 13 of both Figures 1 and 2 are of comparatively small capacity and the currents flowing through them, due to the low frequency alternating current from the line, is negligible. The gaps 9 of Figures 1 and 2 may be one or more spaced electrodes.

In Figure 2, which is a modification of the apparatus shown in Figure 1, the secondary 24 of the transformer 25 is connected, by means of a conductor 45 with the filament 46 of a three electrode thermionic tube 47, having a grid 48. The grid 48 is connected by means of the conductor 49, with one terminal of a coil 50, the other terminal of which is connected by means of a conductor 51 with the conductor 45 which, as stated, is connected with one terminal of the transformer secondary 24. The plate 52 of the thermionic tube 47 is connected to one terminal of a coil 53, which is inductively coupled with the coil 50. One terminal of the coil 53 is connected by means of the conductor 54 between the turns $12^a$, and $12^b$ of the coil 11. A conductor 55 is connected between the coil 12$^b$ and 12$^c$ and is brought out to a point 56. A condenser 57 is connected across the conductors 54 and 55.

A conductor 58 is connected to one terminal of the transformer secondary 24 and is also connected with the conductor 55 at the point 56.

In Figure 2 the thermionic tube 47 oscillates, during one-half of the cycle as will be readily understood, and is effective to cause the air gap 9 to become conductive only during each half cycle of the alternating current supply.

Figure 4:
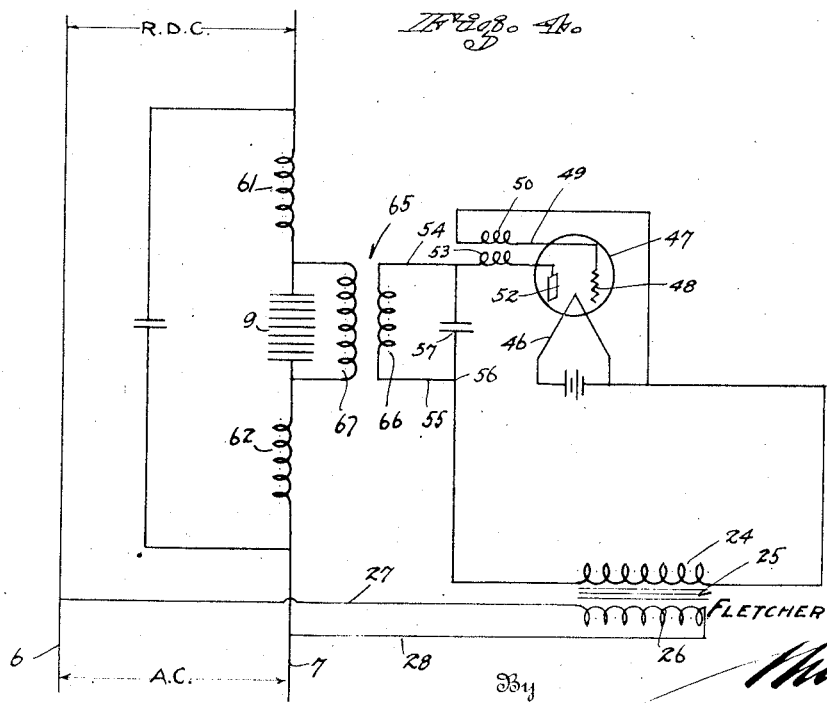

In Figures 3 and 4, the air gaps 9, in series with choke coils 61 and 62, are connected in the side 7 of the circuit 5. The condenser 63 is connected to the outer terminals of the choke coils 61 and 62. The transformers 65, having primaries 66 and secondaries 67, of high resistance, have the latter connected across the terminals of the air gaps 9.

In Figure 3 the secondary 66 has one of its terminals connected to one terminal of a condenser 68, the other terminal of which is connected to the terminal 19 of the spark gap 21. The other terminal of the primary 66 is connected to the terminal 20 of the spark gap 21. This figure is otherwise similar to Figure 1 and includes the transformer 25, the synchronous motor 41, arranged to drive a rectifying contactor 40, which may be thrown in by means of the switch 23. This circuit also includes the thermionic tube 33.

The function of this apparatus, as will be readily understood, is effective to render the spark gap 9 conductive during only one half of the alternating current cycle of the supply line.

In Figure 4 the secondary 66 of the transformer 65 has one of its terminals connected to the conductor 54, while its other terminal is connected to the conductor 55, otherwise the apparatus is, except as hereinbefore described, the same as that described in Figure 2. In this form also the apparatus functions to render the spark gap 9 conductive only during one half of the cycle of the alternating current supply line.

It will be understood that the air gaps 9 in all the forms of my invention shown and described are to be unstable at the voltage of the alternating current supply.

I claim:—

A rectifying system comprising an alternating current line having a gap, a plurality of turns of wire in series with the gap and a condenser across the gap and the turns, an oscillating circuit across one of the turns, and means for producing an oscillating high frequency current in the latter circuit in synchronism with one set of alternations in the line whereby the gap is ionized and allows the alternations of the said set to pass for producing a unidirectional current.

FLETCHER L. WALKER, Jr.